(12) United States Patent
Urcia et al.

(10) Patent No.: US 10,340,584 B2
(45) Date of Patent: Jul. 2, 2019

(54) STRUCTURAL MULTILAYER ANTENNA DESIGN AND FABRICATION

(71) Applicant: The Boeing Company, Chicago, IL (US)

(72) Inventors: Manny S. Urcia, Wildwood, MO (US); Andrew S. Niederschulte, St. Louis, MO (US); Alec Adams, Seattle, WA (US); Lixin Cai, Ravensdale, WA (US); Timothy J. Luchini, St. Louis, MO (US); Justin J. Schell, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/671,796

(22) Filed: Aug. 8, 2017

(65) Prior Publication Data

US 2019/0051976 A1    Feb. 14, 2019

(51) Int. Cl.
| | | |
|---|---|---|
| *H01Q 1/28* | (2006.01) | |
| *B64C 1/12* | (2006.01) | |
| *B64C 3/26* | (2006.01) | |
| *H01Q 1/12* | (2006.01) | |
| *H01Q 1/40* | (2006.01) | |
| *H01Q 3/26* | (2006.01) | |
| *H01Q 1/38* | (2006.01) | |

(52) U.S. Cl.
CPC ............... *H01Q 1/286* (2013.01); *B64C 1/12* (2013.01); *B64C 3/26* (2013.01); *H01Q 1/1207* (2013.01); *H01Q 1/287* (2013.01); *H01Q 1/38* (2013.01); *H01Q 1/40* (2013.01); *H01Q 3/26* (2013.01)

(58) Field of Classification Search
CPC ........ H01Q 1/286; H01Q 1/1207; B64C 1/12; B64C 3/26
USPC .......................................... 343/705, 700 MS
See application file for complete search history.

(56) References Cited

U.S. PATENT DOCUMENTS

| | | |
|---|---|---|
| 4,208,660 A | 6/1980 | McOwen, Jr. |
| 5,184,141 A | 2/1993 | Connolly et al. |
| 5,437,091 A | 8/1995 | Norman |
| 5,648,786 A | 7/1997 | Chung et al. |
| 7,167,129 B1 | 1/2007 | Strassner, II |
| 7,883,050 B2 | 2/2011 | Dufresne et al. |
| 2014/0159965 A1* | 6/2014 | Le ............... H01Q 1/28 343/705 |
| 2016/0170250 A1* | 6/2016 | Ghali ............ G02F 1/13338 359/296 |
| 2017/0302006 A1* | 10/2017 | Lavin ............... H01Q 1/287 |

OTHER PUBLICATIONS

European search report dated Dec. 19, 2018, issued in co-pending European Patent Application No. 18186238.4.

* cited by examiner

*Primary Examiner* — Peguy Jean Pierre
(74) *Attorney, Agent, or Firm* — Joseph M. Rolnicki; Evans & Dixon L.L.C.

(57) ABSTRACT

A structural panel of an aircraft is constructed with a multiphase antenna embedded inside the structural panel between multiple sheets of fiberglass.

20 Claims, 6 Drawing Sheets

STRUCTURAL MULTILAYER ANTENNA DESIGN AND FABRICATION

FIELD

This disclosure pertains to the structure and fabrication of a multilayer antenna design, more specifically a phased array antenna, embedded inside a structural panel of an aircraft.

BACKGROUND

The construction of a typical antenna system, and specifically a phased array antenna system, can be very large and heavy. A typical phased array antenna system can be 6' long, 18" tall and 1½ thick. When such an antenna system is integrated into an aircraft, the antenna system itself and the support structure required for the antenna system can occupy a substantial portion of the internal volume of the aircraft. If such an antenna system and its required support structure is attached to the exterior of the aircraft, they can add substantial drag to the aircraft.

SUMMARY

The structural multilayer antenna design of this disclosure and its fabrication overcome the disadvantages of integrating a phase array antenna and its support structure in the interior volume of an aircraft or attaching the antenna and its support structure to the exterior of the aircraft.

The antenna of this disclosure is embedded inside a structural panel of an aircraft. The structural panel could be a panel of the fuselage construction of the aircraft, a panel of a wing construction of the aircraft, a panel of a tail rudder construction of the aircraft, or other similar structural panels. By being fabricated in a structural panel of the aircraft, the antenna does not require any of the interior volume of the aircraft, it does not require any support structure, and it does not create a source of drag on the exterior of the aircraft.

In the method of constructing the antenna embedded inside a structural panel of an aircraft, a first sheet of a radio frequency (RF) penetrable structural material, such as fiberglass is formed. Other materials such as cyanate ester resin prepreg fabric, Astroquartz® (Astroquartz is a registered trademark of J.P. Stevens & Co., Inc.), and other equivalent materials could be used to form the first sheet. The first sheet is rigid and has a curved configuration with a generally convex top surface and a generally concave bottom surface. The curved configuration of the first sheet is determined to match the curved configuration of the aircraft component the structural panel is to become a part of.

A first antenna layer of electrically conductive material is fixed to the top surface of the first sheet. The electrically conductive material could be copper foil.

A distribution layer of electrically conductive material is fixed to the bottom surface of the first sheet. The distribution layer could also be a copper foil fixed to the bottom surface.

A first antenna configuration is etched into the first antenna layer.

A distribution configuration is etched into the distribution layer.

A second sheet for the structural panel is also formed from fiberglass. The second sheet is rigid and has a curved configuration with a generally convex top surface and a generally concave bottom surface.

A second antenna layer of electrically conductive material is fixed to the bottom surface of the second sheet. The second antenna layer could be of copper foil.

A second antenna configuration is etched into the second antenna layer.

Alternatively, any practical combination of antenna layers and distribution layers could be used in the structural panel of the aircraft.

Where the structural panel of the aircraft is constructed with multiples of antenna layers and distribution layers, the vias can be formed through all of the layers. The vias can enable electrical connections between antenna layers, electrical connections between antenna layers and distribution layers, etc. The vias can also be used as "gates" around features to isolate those features.

With the first antenna layer and the second antenna layer connected in electrical communication, the first sheet and the second sheet are positioned relative to each other or are registered relative to each other for creating a phased array antenna from the first antenna layer and the second antenna layer.

The first sheet and the second sheet are positioned in a molding apparatus that is operable to perform a stamp forming process. The first sheet and the second sheet are then secured together using the stamp forming process with the top surface of the second sheet engaging against the bottom surface of the first sheet, creating a phased array antenna inside a structural panel of an aircraft.

The above described method creates a phased array antenna comprising a first antenna layer and a second antenna layer embedded inside a structural panel of an aircraft.

Additional electrical layers and structural layers can be created as required.

The features, functions, and advantages that have been discussed can be achieved independent in various embodiments or may be combined in yet other embodiments, further details of which can be seen with reference to the following description and drawings.

DETAILED DESCRIPTION

Figure 1:
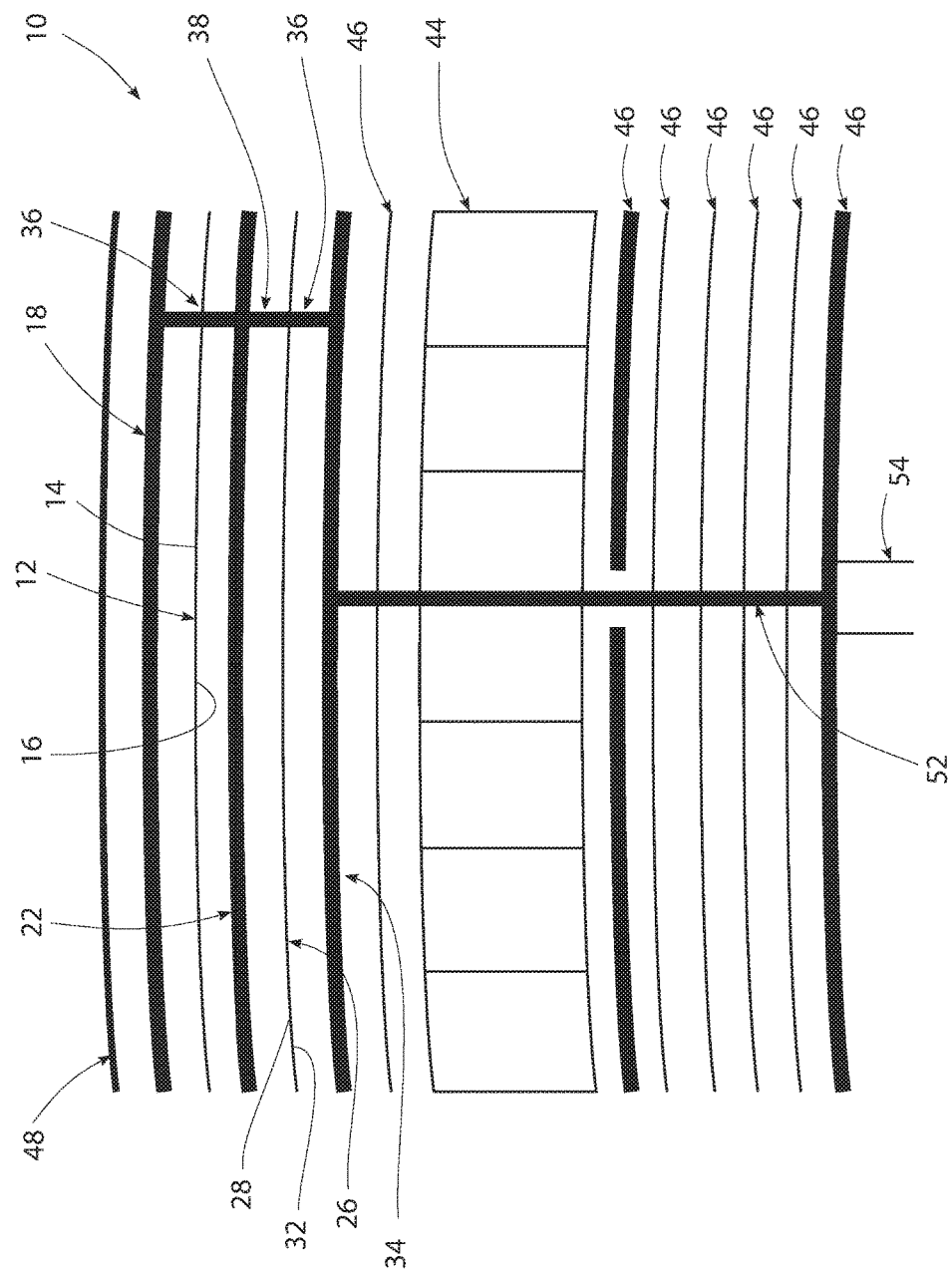
FIG. 1 is a schematic representation of a cross-section view through a phased array antenna embedded inside a structural panel of an aircraft fabricated according to the method of this disclosure.

FIG. 1 is a schematic representation of a cross-section view of a portion of a phased array antenna embedded inside a structural panel 10 of an aircraft fabricated according to the method of this disclosure. As stated earlier, the structural panel 10 could be a panel of the fuselage construction of the aircraft, a panel 10 of a wing construction of the aircraft, a panel 10 of a tail rudder construction of the aircraft, or a panel of other structural panels of the overall aircraft construction.

Figure 2:
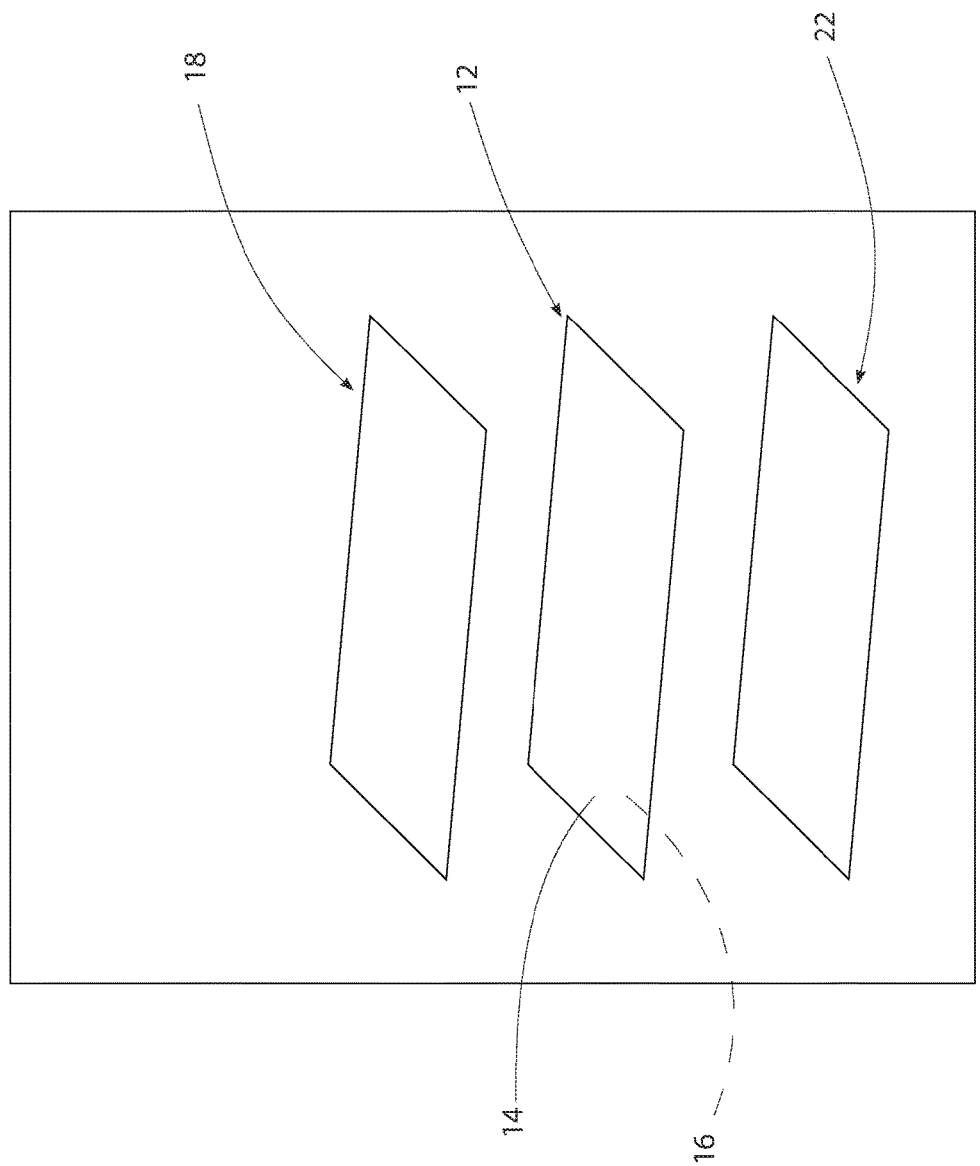
FIG. 2 is a representation of a first step in the method of this disclosure.

Referring to FIG. 2, in the method of constructing the antenna embedded inside a structural panel 10 of an aircraft, a first sheet of fiberglass 12 is formed. To enhance the structural strength of the panel 10, a high strength fiberglass, such as Astroquartz® fiberglass produced by JPS Composite Materials, a subsidiary of JPS Industries, Inc. is used to form the first sheet 12. Although the first sheet 12 is represented as having a general rectangular configuration in FIG. 2, the first sheet 12 could have any configuration that would match the configuration of the structural component part of the aircraft panel constructed according to the method described herein. Additionally, although the first sheet 12 is represented as being generally flat in FIG. 2, the first sheet 12 could in most applications have a curved configuration that matches the curved configuration of the structural component part of the aircraft the panel is to become a part of. Such a first sheet 12 constructed of fiberglass is rigid and has a curved configuration. A top surface 14 of the first sheet has a general convex configuration and the bottom surface 16 of the first sheet 12 has a general concave configuration.

Referring to FIGS. 1 and 2, a first antenna layer 18 is represented. The first antenna layer 18 has the same configuration as the first sheet 12. The first antenna layer 18 is constructed of electrically conductive material that is often used in the construction of antennas, for example copper foil.

Also represented in FIGS. 1 and 2 is a RF power distribution network layer 22. The distribution network layer 22 has the same configuration as the first sheet 12. The distribution network layer 22 is also constructed of electrically conductive material that is often used in the construction of antennas, for example copper foil.

Figure 3:
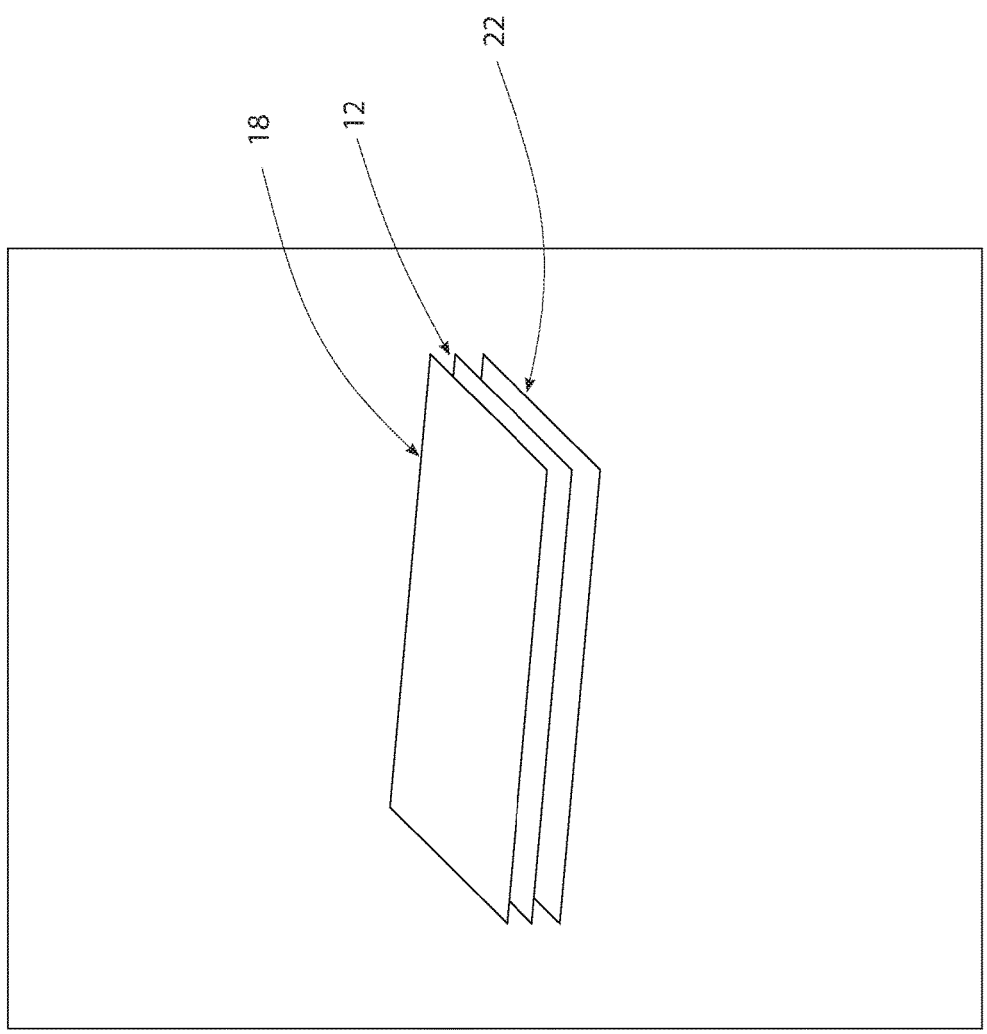
FIG. 3 is a representation of a second step of the method of this disclosure.

FIG. 3 is a representation of fixing the first antenna layer 18 to the top surface 14 of the first sheet 12, and fixing the distribution network layer 22 to the bottom surface 16 of the first sheet 12. The first antenna layer 18 and the distribution network layer 22 can be fixed to the opposite surfaces of the first sheet 12 according to any of the known methods and processes used in the production of a printed circuit board.

Figure 4:
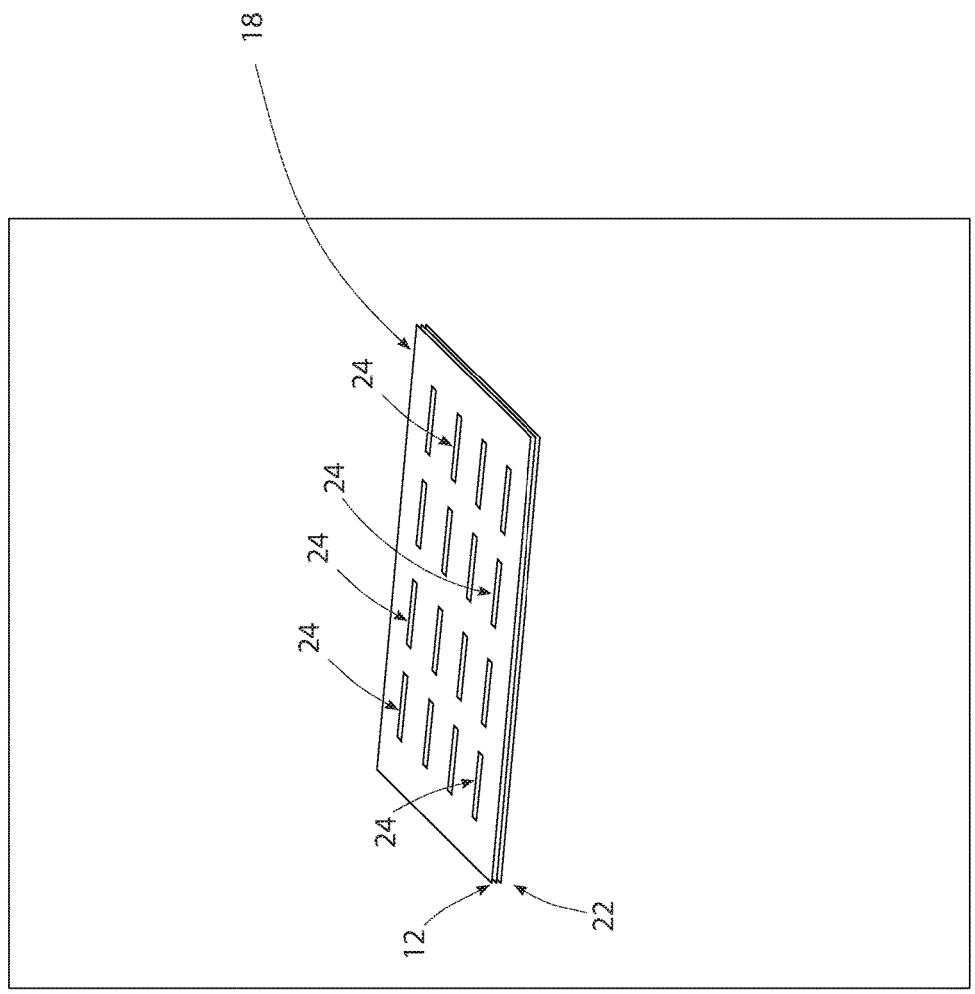
FIG. 4 is a representation of a third step of the method of this disclosure.

Referring to FIG. 4, a desired antenna configuration is formed into the first antenna layer 18 on the first sheet 12, and a desired distribution network configuration is formed in the distribution network layer 22 on the first sheet 12. The first antenna configuration can be formed into the first antenna layer 18 by any of the known methods and processes used in the production of a printed circuit board. For example, an ultraviolet light sensitive film or a photo "resist" film is applied and secured to the first antenna layer 18 on the first sheet 12 by the application of heat and pressure. An image film having the desired configuration of the first antenna layer is then applied over the "resist" film.

The first antenna layer 18 is then exposed to high intensity ultraviolet light. The ultraviolet light passes through clear areas of the image film and hardens portions of the "resist" film that are not covered by the dark areas of the image film.

The portions of the "resist" layer that are not hardened by the ultraviolet light are then removed. This exposes portions of the first antenna layer electrically conductive material that are not covered by the hardened "resist". The exposed portions of the electrically conductive material of the first antenna layer are then removed chemically as represented by the areas 24 in FIG. 4, thereby etching the desired first antenna configuration into the first antenna layer. The hardened "resist" is then removed, exposing the configuration of the first antenna layer 18 on the top surface 14 of the first sheet 12.

The distribution network configuration is formed in the distribution network layer 22 in the same manner discussed above with regard to the first antenna layer 18 configuration.

Figure 5:
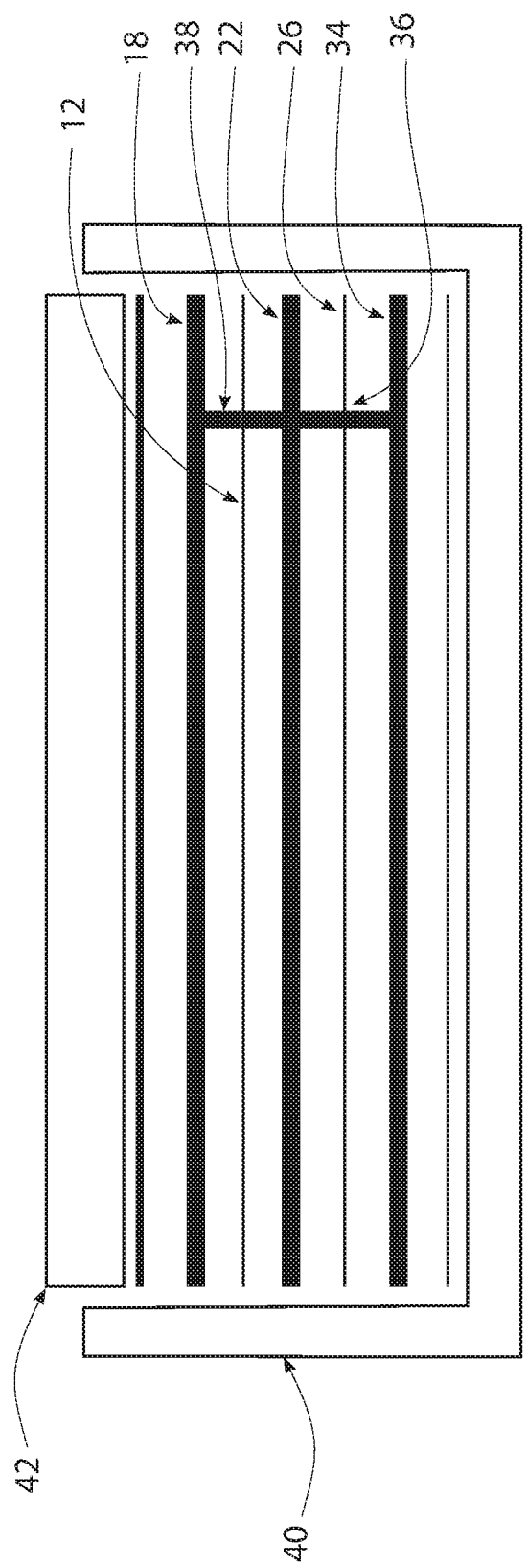
FIG. 5 is a schematic representation of a stamp formed process used to form the phased array antenna.
Figure 6:
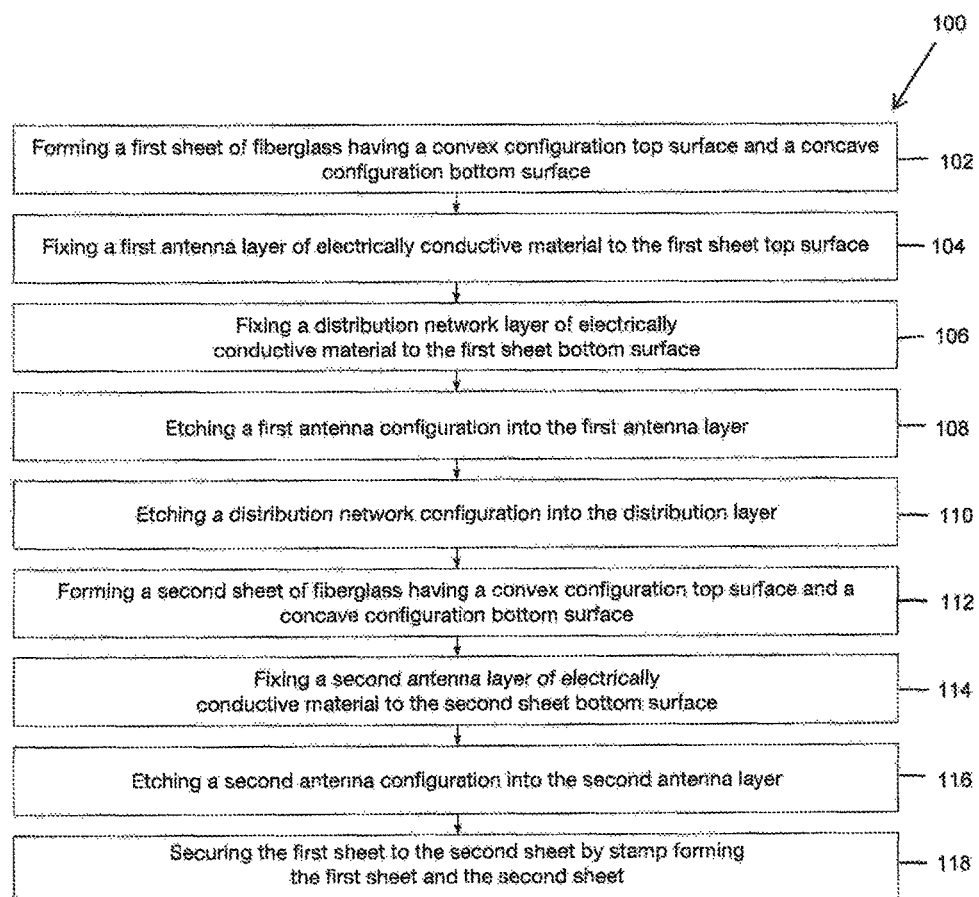
FIG. 6 is a flow chart representing the method steps of this disclosure.

The above method steps produce the first antenna layer 18, the first sheet of fiberglass 12 and the distribution network layer 22 represented in FIG. 5. To create a phased array antenna inside the panel 10 of the aircraft, a second sheet 26 of high strength fiberglass is then formed. The second sheet 26 has the same configuration as the first sheet 12, and is constructed in substantially the same manner. The second sheet 26 is also rigid and has a curved configuration with a top surface 28 having a general convex configuration and an opposite bottom surface 32 having a general concave configuration. In substantially the same manner as the first antenna layer 18, a second antenna layer 34 of electrically conductive material, for example copper foil, is fixed to the bottom surface 32 of the second sheet 26. In substantially the same manner as described above with regard to the first sheet 12, a desired second antenna configuration is etched into the second antenna layer 34.

Inter-laminar feeds or vias 36 are formed through first sheet 12, and the second sheet 26. The vias 36 are provided to enable electric communication between the first antenna layer 18, the distribution network layer 22 and the second antenna layer 34.

As represented in FIG. 5, the first sheet 12 and the second sheet 26 are then registered relative to each other or are positioned relative to each other in the positions they will occupy in the final construction of the phased array antenna inside the panel 10 of the aircraft. Electrical communicators 38 are passed through vias 36 and communicate with the first antenna layer 18 and the second antenna layer 34, providing electrical communications between the two antenna layers. The distribution network layer 22 is capacitively coupled to the first antenna layer 18 and the second antenna layer 34.

With the first antenna layer 18, the distribution network layer 22 and the second antenna layer 34 connected in electrical communication by the electrical communicators 38, the first sheet 12 and the second sheet 26 are positioned relative to each other or are registered relative to each other in a molding apparatus that is operable to perform a stamp forming process. FIG. 5 is a schematic representation of a molding apparatus comprising a mold 40 and a press 42. The first sheet 12 and the second sheet 26, together with the first antenna layer 18, the second antenna layer 34, the distribution network layer 22 all communicating through the electrical communicators 38 are positioned in the mold 40. The press 42 is then lowered into the mold 40 applying pressure to the first sheet 12 and the second sheet 26 while the mold 40 heats the first sheet 12 and the second sheet 26. The first sheet 12 and the second sheet 26 are then secured together using the stamp forming process, for example a thermoset stamp forming process, with the top surface 28 of the second sheet 26 engaging against the bottom surface 16 of the first sheet 12, creating a phased array antenna inside a structural panel 10 of an aircraft.

As represented in FIG. 1, the first sheet 12 and the second sheet 26 that have been cured together can then be secured to an open cell core panel 44 of the structural panel 10 of the aircraft. Additional structural sheets 46 are also represented in FIG. 1. These additional structural sheets 46 could be additional layers of fiberglass or other equivalent materials employed in the construction of the structural panel 10, depending on the intended use of the structural panel 10 in the aircraft. Where the structural panel 10 is to be used as part of an exterior structure of the aircraft, a protective cover layer 48 could be applied to the structural panel 10 to protect the antenna inside the panel.

Although the structural panel 10 has been described above as having a first antenna layer 18 and a second antenna layer 34, the panel 10 could be comprised of additional antenna layers and additional distribution layers. The antenna layers and the distribution layers of the antenna would all be communicated by electrical communicators 52 that extend through the core panel 44 and the additional structural sheets 46 to an electrical connector interface 54.

As various modifications could be made in the method of constructing the structural panel of an aircraft with an embedded antenna and the panel herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A method of embedding an antenna inside a structural panel of an aircraft, the method comprising:
   forming a first sheet from fiberglass with the first sheet being rigid and having a top surface and an opposite bottom surface;
   fixing a first antenna layer of electrically conductive material to the top surface of the first sheet;
   fixing a distribution network layer of electrically conductive material to the bottom surface of the first sheet;
   etching a first antenna configuration into the first antenna layer;
   etching a distribution network configuration into the distribution network layer;
   forming a second sheet from fiberglass with the second sheet being rigid and having a top surface and an opposite bottom surface;
   fixing a second antenna layer of electrically conductive material to the bottom surface of the second sheet;
   etching a second antenna configuration into the second antenna layer;
   securing the first sheet to the second sheet with the bottom surface of the first sheet engaging with the top surface of the second sheet;
   forming a third sheet from fiberglass with the third sheet being rigid and having a top surface and an opposite bottom surface; and,
   securing the third sheet to the second sheet with the too surface of the third sheet engaging with the second antenna layer of electrically conductive material fixed to the bottom surface of the second sheet.

2. The method of claim 1, further comprising:
   securing the first sheet to the second sheet by applying heat and compression pressure to the first sheet and the second sheet in a stamp forming process.

3. The method of claim 2, further comprising:
   registering the first sheet and the second sheet relative to each other prior to applying heat and compression pressure to the first sheet and the second sheet in the stamp forming process.

4. The method of claim 1, further comprising:
   forming the first sheet with a curved configuration; and,
   forming the second sheet with a curved configuration.

5. The method of claim 1, further comprising:
   securing the first sheet and the second sheet to an open cell core panel of the structural panel of the aircraft.

6. The method of claim 1, further comprising:
   forming vias through the second sheet; and,
   electrically communicating the first antenna layer and the second antenna layer through the vias formed through the second sheet.

7. The method of claim 1, further comprising:
   forming the structural panel as a portion of a fuselage of the aircraft.

8. The method of claim 1, further comprising:
   forming the structural panel as a portion of a wing of the aircraft.

9. The method of claim 1, further comprising:
   forming the structural panel as a portion of a tail rudder of the aircraft.

10. A method of embedding an antenna inside a structural panel of an aircraft, the method comprising:
    forming a first sheet from fiberglass with the first sheet being rigid and having a curved configuration, the first sheet having a top surface that has a convex configuration and the first sheet having a bottom surface that has a concave configuration;
    fixing a first antenna layer of copper foil to the top surface of the first sheet;
    fixing a distribution network layer of copper foil to the bottom surface of the first sheet;
    etching a first antenna configuration into the first antenna layer;
    etching a distribution network configuration into the distribution network layer;
    forming a second sheet from fiberglass with the second sheet being rigid and having a curved configuration, the second sheet having a top surface that has a convex configuration and the second sheet having a bottom surface that has a concave configuration;
    fixing a second antenna layer of copper foil to the bottom surface of the second sheet;
    etching a second antenna configuration into the second antenna layer;
    securing the first sheet to the second sheet with the top surface of the second sheet engaging against the bottom surface of the first sheet;
    forming a third sheet from fiberglass with the third sheet being rigid and having a curved configuration, the third sheet having a too surface that has a convex configuration and the third sheet having a bottom surface that has a concave configuration; and
    securing the third sheet to the second sheet with the top surface of the third sheet engaging against the second antenna layer of copper foil fixed to the bottom surface of the second sheet.

11. The method of claim 10, further comprising:
    creating a phased array antenna by securing the first sheet to the second sheet.

12. The method of claim 11, further comprising:
    forming vias through the second sheet;
    electrically communicating the first antenna layer and the second antenna layer through the vias formed through the second sheet prior to securing the first sheet to the second sheet; and,
    applying heat and compression pressure to the first sheet and the second sheet when securing the first sheet to the second sheet using a stamp forming process.

13. The method of claim 10, further comprising:
    after securing the first sheet to the second sheet using a stamp forming process, securing the first sheet and the second sheet to an open cell core panel of the structural panel of the aircraft.

14. A method of embedding an antenna inside a structural panel of an aircraft, the method comprising:

forming a first sheet from fiberglass with the first sheet being rigid and having a curved configuration, the first sheet having a top surface that has a convex configuration and the first sheet having a bottom surface that has a concave configuration;

fixing a first antenna layer of copper foil to the top surface of the first sheet;

fixing a distribution network layer of copper foil to the bottom surface of the first sheet;

etching a first antenna configuration into the first antenna layer;

etching a distribution network configuration into the distribution network layer;

forming a second sheet from fiberglass with the second sheet being rigid and having a curved configuration, the second sheet having a top surface that has a convex configuration and the second sheet having a bottom surface that has a concave configuration;

fixing a second antenna layer of copper foil to the bottom surface of the second sheet;

etching a second antenna configuration into the second antenna layer;

securing the first sheet to the second sheet with the top surface of the second sheet engaging against the bottom surface of the first sheet;

forming a third sheet from fiberglass with the third sheet being rigid and having a curved configuration, the third sheet having a top surface that has a convex configuration and the third sheet having a bottom surface that has a concave configuration; and, securing the third sheet to the second sheet using a stamped forming process with the top surface of the third sheet engaging against the second antenna layer of copper foil fixed to the bottom surface of the second sheet.

15. The method of claim 14, further comprising:
forming the structural panel as a portion of a fuselage of the aircraft.

16. The method of claim 14, further comprising:
forming the structural panel as a portion of a wing of the aircraft.

17. The method of claim 14, further comprising:
forming the structural panel as a portion of a tail rudder of the aircraft.

18. A structural panel of an aircraft having an embedded antenna, the structural panel comprising:
a first sheet of fiberglass, the first sheet being rigid and having a top surface and an opposite bottom surface;
a first antenna layer fixed on the top surface of the first sheet;
a distribution network layer fixed on the bottom surface of the first sheet;
a second sheet of fiberglass, the second sheet being rigid and having a top surface and an opposite bottom surface;
a second antenna layer fixed on the bottom surface of the second sheet; and
the first sheet and the second sheet having been secured together with the bottom surface of the first sheet engaging with the top surface of the second sheet;
a third sheet of fiberglass, the third sheet being rigid and having a to surface and an opposite bottom surface; and,
the third sheet being secured to the first sheet and the second sheet with the bottom surface of the second sheet engaging with the top surface of the third sheet.

19. A structural panel of an aircraft having an embedded antenna, the structural panel comprising:
a first sheet of fiberglass, the first sheet being rigid and having a top surface and an opposite bottom surface;
a first antenna layer fixed on the top surface of the first sheet;
a distribution network layer fixed on the bottom surface of the first sheet;
a second sheet of fiberglass, the second sheet being rigid and having a top surface and an opposite bottom surface;
a second antenna layer fixed on the bottom surface of the second sheet;
the first sheet and the second sheet having been secured together with the bottom surface of the first sheet engaging with the top surface of the second sheet;
a third sheet of fiberglass, the third sheet being rigid and having a top surface and an opposite bottom surface;
a third antenna layer secured to the bottom surface of the third sheet; and,
the third sheet being secured to the first sheet and the second sheet by a stamp forming process with the bottom surface of the second sheet engaging with the top surface of the third sheet.

20. The structural panel of claim 19, further comprising:
the structural panel being on a portion of an exterior surface of the aircraft.

* * * * *

UNITED STATES PATENT AND TRADEMARK OFFICE
CERTIFICATE OF CORRECTION

PATENT NO. : 10,340,584 B2  
APPLICATION NO. : 15/671796  
DATED : July 2, 2019  
INVENTOR(S) : Manny S. Urcia et al.

Page 1 of 1

It is certified that error appears in the above-identified patent and that said Letters Patent is hereby corrected as shown below:

In the Claims

Column 5 (Line 47) In Claim 1, in Line 27, "too" is changed to --top--.

Column 6 (Line 42) In Claim 10, in Line 30, "too" is changed to --top--.

Column 8 (Line 14) In Claim 18, in Line 18, "to" is changed to --top--.

Signed and Sealed this  
Twenty-seventh Day of August, 2019

Andrei Iancu  
*Director of the United States Patent and Trademark Office*